Jan. 12, 1926.  
H. A. CURTIS  
1,569,118  
AUTOMOBILE WINDOW SCREEN  
Filed April 16, 1924  2 Sheets-Sheet 1
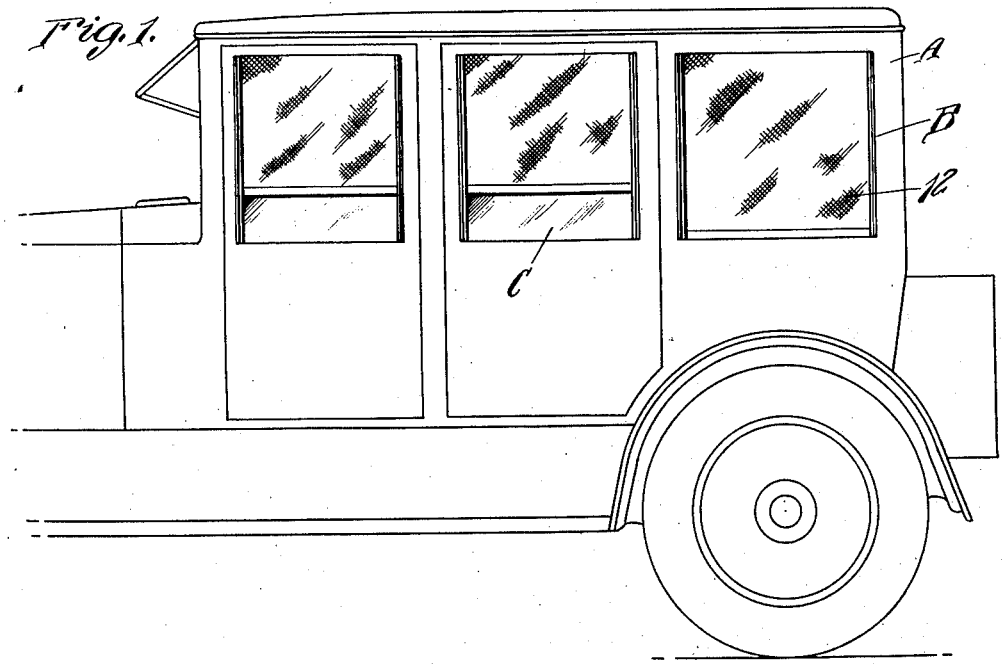
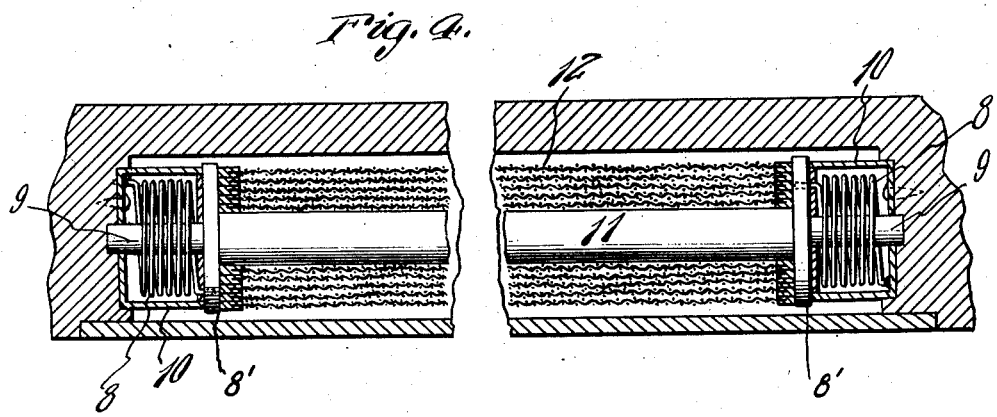
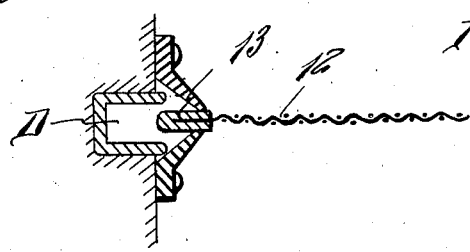
INVENTOR  
H. A. Curtis  
BY Victor J. Evans  
ATTORNEY
WITNESS:

Jan. 12, 1926. 1,569,118
H. A. CURTIS
AUTOMOBILE WINDOW SCREEN
Filed April 16, 1924 2 Sheets-Sheet 2
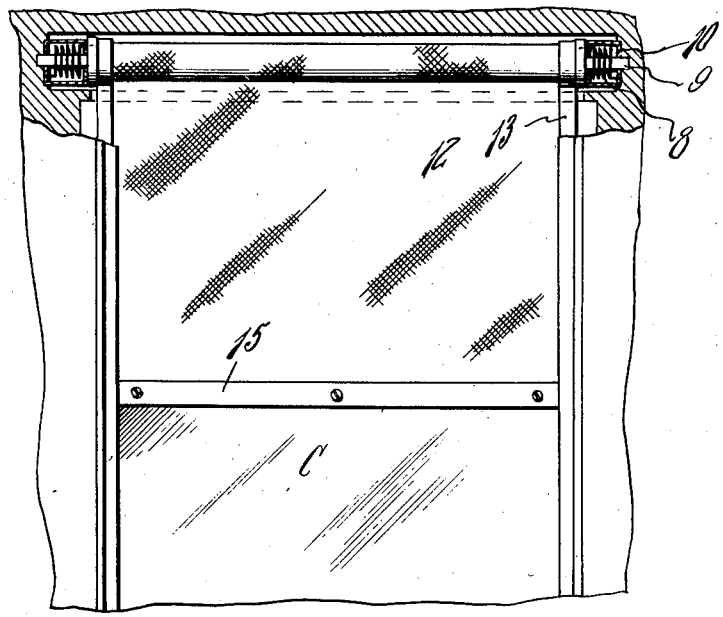
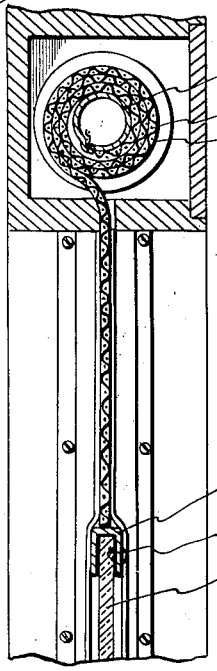
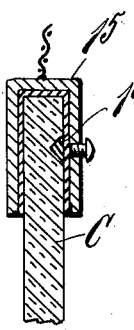
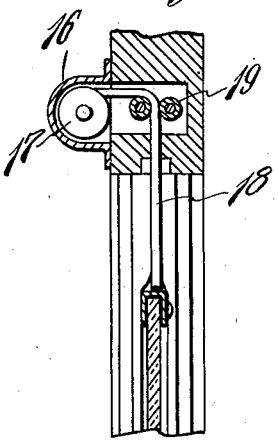
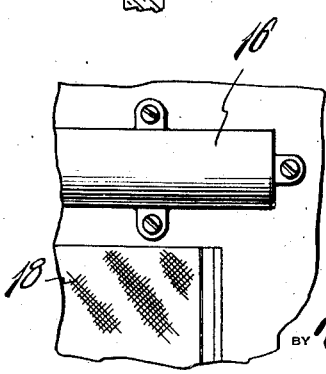
H. A. Curtis
INVENTOR
WITNESS: BY Victor J. Evans
ATTORNEY Patented Jan. 12, 1926.

1,569,118

UNITED STATES PATENT OFFICE.

HARRY A. CURTIS, OF MANITOWOC, WISCONSIN, ASSIGNOR OF ONE-HALF TO ARTHUR WENSING, OF MANITOWOC, WISCONSIN.

AUTOMOBILE WINDOW SCREEN.

Application filed April 16, 1924. Serial No. 706,979.

*To all whom it may concern:*

Be it known that I, HARRY A. CURTIS, a citizen of the United States, residing at Manitowoc, in the county of Manitowoc and State of Wisconsin, have invented new and useful Improvements in Automobile Window Screens, of which the following is a specification.

This invention relates to window screens and has for its object the provision of automatic disappearing screens adapted to be mounted above the slidable windows of a closed automobile and usable to cover the window openings when the windows are open whereby to exclude insects of all kind, not only while driving but also in case the automobile is used as sleeping quarters, by tourists and others.

It is well known that when traveling in an automobile at night insects frequently enter the open windows and get into the eyes of the driver, possibly causing him to lose control of the machine, a condition naturally bound to result in injury or loss of life.

It is also true that when standing with the windows open, mosquitoes and the like will enter the car and make it unfit for sleeping purposes on touring trips or the like unless some provision be made for keeping the insects out. It is a common practice to provide mosquito netting for this purpose, and it is often customary simply to throw a large piece of netting over the car so as to cover the windows. These makeshifts are not satisfactory, as the wind may blow the netting away and as it is necessary to get out of the car to remove or adjust the netting.

It is with the above facts in view that I have designed the present attachment in which the wire screen is mounted upon spring rollers journaled in the doors so as to be concealed when not in use, the end of the screen being attached to the glass so that when the glass is slid into open position the screen will be automatically moved to cover the opening.

An additional object is the provision of a structure or device of this character which will be simple and inexpensive in manufacture, easy to install in new or already existing cars, which will be a great convenience and safe guard and also a general improvement in the art.

With the above and other objects and advantages in view the invention consists in the details of construction to be hereinafter more fully described and claimed and illustrated in the accompanying drawings, in which:

Figure 1 is a side elevation of an automobile equipped with my screens,

Figure 2 is an enlarged view of one window with the car body broken away to show the mounting of the screen, this view being on a considerably larger scale than Figure 1, Figure 3 is a vertical section taken through Figure 2, Figure 4 is a detail longitudinal section through one of the spring rollers, Figure 5 is a detail view illustrating means for connecting the screen with the edge of the glass, Figure 6 is a detail section on a larger scale through one side of the window showing the guide means for the screen, Figure 7 is a fragmentary elevation showing the invention made and applied as an attachment, Figure 8 is a vertical cross section therethrough.

Referring more particularly to the drawings the letter A designates a closed automobile body of the type having window openings B normally closed by glass panes C which are operated in any of the ordinary ways, this detail not entering into the invention. It is well known that the glass panes slide between guides $d$.

In carrying out my invention I provide spring boxes 10 mounted within the body of the car or within the doors as the case may be above the window openings, and journaled through these boxes are trunnions 9 on the ends of a roller 11 on which is secured and about which is wrapped wire screen 12 which has its edges bound with tape, felt or the like indicated at 13. The rollers need not be provided with any ratchet mechanism like in shade rollers for the reason that it is intended that the free end of the screen be connected with the window panes C. Surrounding the trunnions are springs 8 connected at one end with the roller and having their other ends suitably anchored to the boxes. The roller is formed or otherwise provided with heads 8' located adjacent the confronting sides of the spring boxes, the screen being arranged upon the roller between these heads. In the present instance, the springs are represented as having their ends connected with these heads which form a part of the roller.

It is of course conceivable that various means might be employed for connecting the screen with the window pane, but it is a very simple matter to provide the groove 14 extending along the pane at one side, or both if preferred, and to provide a metallic element 15 soldered or otherwise secured to the end of the screen and crimped about the edge of the glass so as to engage firmly within the groove.

In the operation it will be apparent that when the windows are closed, the screens are entirely rolled upon the rollers and will be entirely invisible. When a window is opened, it is obvious that the movement of the glass will unroll the screen and drag it across the opening so that no flies or other insects can enter the car.

In case the device is to be applied as an attachment to already existing cars, I make use of a casing 16 adapted to be mounted at the top of a window and containing a spring roller 17 to which is secured and about which is wrapped the screen 18 which is guided between two small co-acting rollers 19 mounted in the top of the door opening so that the screen will travel in the same plane with the glass. The edges of the screen are guidably held as above described and the free end is of course attached to the glass as indicated.

From the foregoing description and a study of the drawings it will be apparent that I have thus provided a very simple screen attachment which may be applied at low cost to already existing cars, or which may be built into new cars during their process of construction. The device is automatic and therefore requires no manipulation or adjustment and is always ready for service.

While I have shown and described the preferred embodiment of my invention it is of course to be understood that I reserve the right to make such changes in the form, construction and arrangement of parts as will not depart from the spirit of the invention or the scope of the subjoined claim.

I claim:

A screen attachment for the slidably mounted windows of a closed vehicle, comprising a roller located above the window and carrying heads, a screen secured to and wrapped about the roller between said heads, means connecting the end of said screen to the slidably mounted window, stationarily mounted casings at the ends of said roller beyond the heads thereon provided with bearings for the end portions of the roller, and coil springs located within said casings and each having one end connected to the outer wall thereof and its other end connected with the adjacent head.

In testimony whereof I affix my signature.

HARRY A. CURTIS.